Oct. 5, 1965
K. M. SPARROW
3,210,644
DYNAMO ELECTRIC MACHINE
Filed Feb. 8, 1960
3 Sheets-Sheet 1
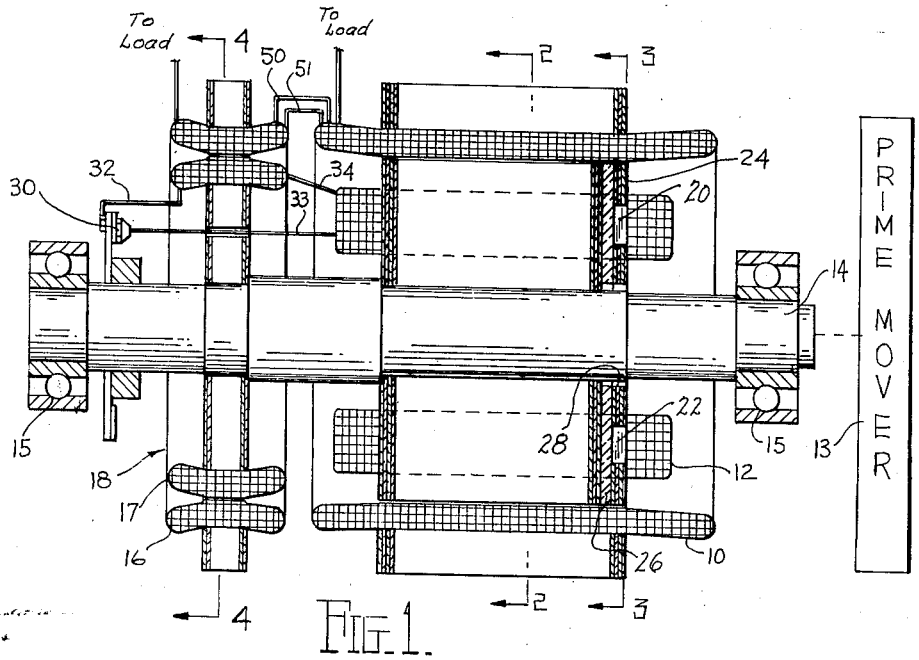
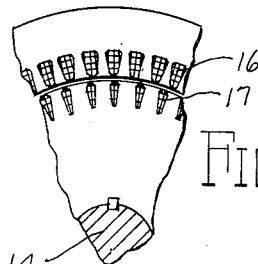
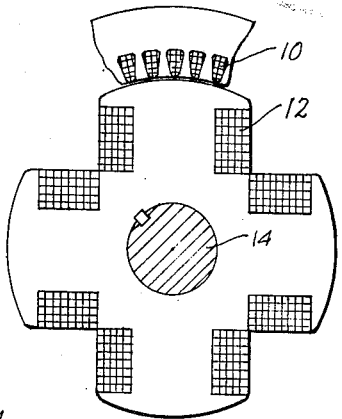
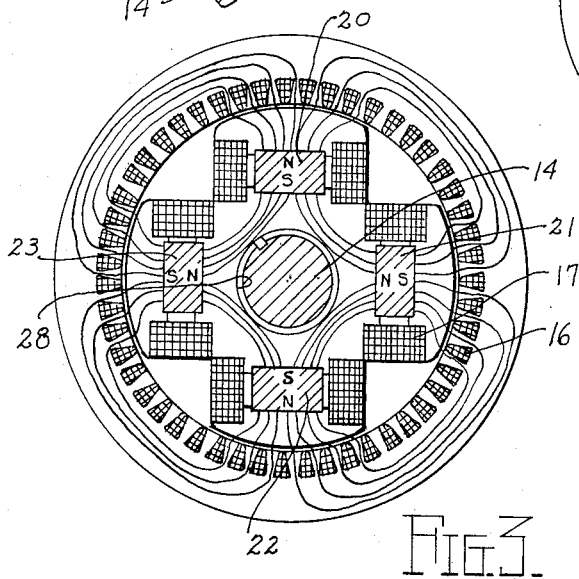
INVENTOR.
Kenneth M. Sparrow
BY
Owen & Owen
ATTORNEYS INVENTOR.
Kenneth M. Sparrow
BY
ATTORNEYS

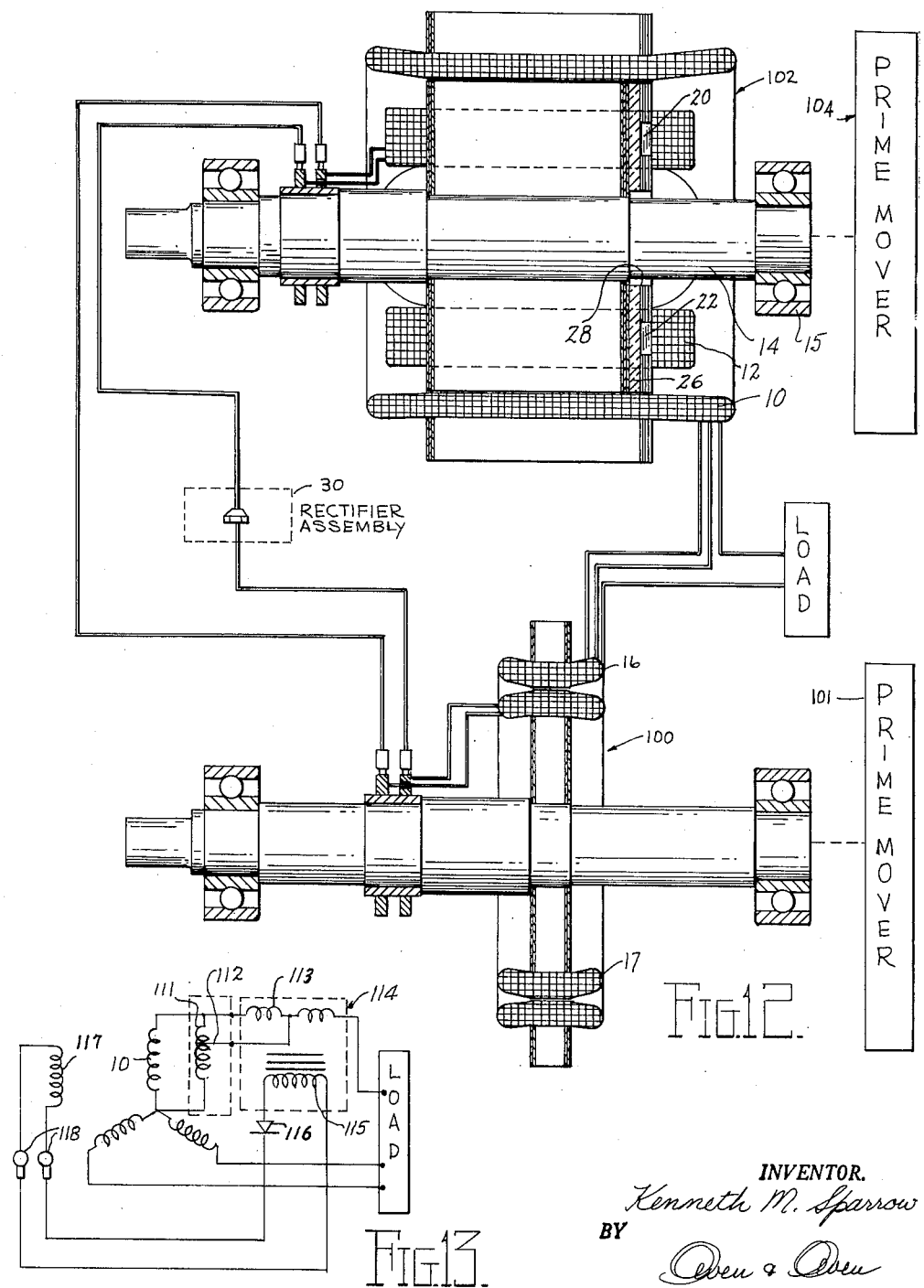

United States Patent Office 3,210,644
Patented Oct. 5, 1965

3,210,644
DYNAMO ELECTRIC MACHINE
Kenneth M. Sparrow, Lima, Ohio, assignor to Lima Electric Motor Co., Inc., Lima, Ohio, a corporation of New York
Filed Feb. 8, 1960, Ser. No. 7,243
1 Claim. (Cl. 322—25)

This invention relates to dynamo electric machines and is particularly directed to a novel excitation system for the field of an alternating current generator.

One of the primary objects of the invention is to provide means to supply excitation current to an alternating current generator in the form of rectified alternating current derived from a transformer exciter, having a compound or divided primary winding, one portion of which is shunted across a small portion of the main generator winding and the other portion of which carries a current proportional or equal to the generator load current, the secondary of said transformer exciter being connected through a rectifier to the generator field winding.

It is a further object of the invention to supply excitation to the field of an alternating current generator which increases as the load current increases, the increase in exciter output being instantaneous with an increase in load current.

It is a still further object of the present invention to provide a regulator circuit for the transformer exciter above mentioned, which supplies rectified power to the field circuit of a main alternating current generator whereby the output power of the exciter is inherently influenced by the load current of the alternating current generator to provide a compounding characteristic to the generator.

It is still another object of the present invention to incorporate a permanent magnet circuit in an alternating current generator having a wound field structure, said permanent magnet circuit being in parallel with and magnetically isolated from the magnetic circuit of the alternating current generator to provide a positive residual flux for initial build-up of the generator output voltage.

It is a further object of the present invention to provide an improved brushless alternating current generator exciter regulator unit having a permanent magnet circuit incorporated within the generator revolving main field structure to provide a positive residual flux for positive initial build-up of the generator voltage, and a fast response rotating transformer exciter, having the exciter rotor mounted on a common shaft with the generator field rotor to apply the exciter secondary output voltage to the generator field circuit through a rotating rectifier assembly.

Other objects and advantages of the invention will become apparent from the following description of a preferred form thereof, reference being had to the accompanying drawings, in which:

FIGURE 1 is a diagrammatic, fragmentary sectional view of an alternating current generator embodying the present invention;

FIG. 2 is a fragmentary section on line 2—2 of FIG. 1;

FIG. 3 is a section on line 3—3 of FIG. 1;

FIG. 4 is a fragmentary sectional view taken on line 4—4 of FIG. 1;

Figure 5:
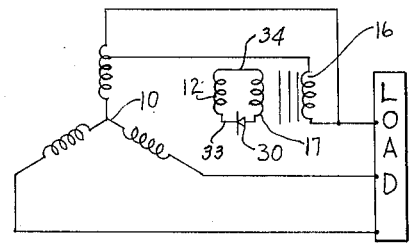

FIGS. 5 to 11, inclusive, are circuit diagrams embodying the present invention;

FIG. 12 is a diagrammatic view, with parts in section, of a modified form of the invention; and FIG. 13 is a circuit diagram of a modified form of the invention.

Referring to the drawings, the present invention is shown in conjunction with an alternating current generator having a stator winding 10 and a rotating field winding 12, each of said windings being associated with appropriate laminated core structures. The generator is shown diagrammatically and is driven by an appropriate prime mover 13. The field coils and their magnetizable laminations are carried on a shaft 14 journaled in appropriate bearings 15 at each end, and in the form shown in FIG. 1 an exciter designated generally 18 is carried on the same shaft.

Figure 6:
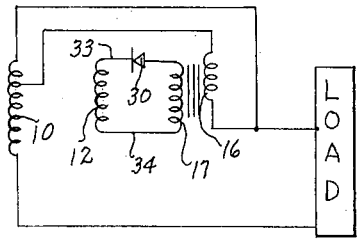

In the preferred form of brushless alternating current generator described above, the exciter 18 comprises a rotating transformer and is similar in form to a wound rotor induction motor, the stator 16 and rotor 17 of which comprise stacks of relatively thin magnetic laminations and appropriate windings. The exciter stator 16 and rotor 17 can be wound either single-phase or multiple-phase, and the exciter rotor is preferably wound with the same number of poles as the exciter stator windings. FIG. 6 shows an exciter of the single-phase winding type, while FIG. 11 indicates the circuit using a multiple-phase exciter winding.

The initial voltage build-up of the alternator is provided by permanent magnets 20, 21, 22 and 23 disposed as shown in FIG. 3. While a magnet is shown in connection with each of the poles of the generator field, it is possible to derive sufficient flux from a single pair, provided the relationship of the magnetic poles is such as to force the flux across the alternator air gap to link the stator coils, and provided a proper return path is established between the magnets so arranged that no significant leakage can occur. The number of magnets must be at least equal to half the number of poles of the generator. In the specific embodiment shown, the magnets 20–23 are virtually embedded in laminations 24 which are magnetically isolated from the remainder of the laminations of the rotating field structure by non-magnetic spacers 26 and are additionally spaced from the shaft 14 by an air gap 28. Both the spacer 26 and the shaft air gap 28 are made large as compared with the main air gap of the machine formed between the rotor 12 and stator 10. Thus the axial flow of flux from the permanent magnets into the remainder of the field laminations is, for all practical purposes, prevented since a minimum of leakage flux will pass across the large air gap 28 and into the shaft, nor will such flux pass through the relatively thick magnetic isolation member 26. The flux from the permanent magnets, therefore, is forced to link the stator coils and is forced to return through the stator laminations of the machine to an adjacent magnet, and the return flux is forced to flow through the separate set of laminations 24. There is thus provided a positive residual flux which is sufficient to provide an initial voltage build-up in the alternator power winding 10.

The exciter 18 is preferably of the form of a wound rotor induction motor having its windings arranged to provide the same number of poles on the rotor as on the stator. Thus, the exciter rotor 17 becomes virtually the secondary of a rotating current transformer induction frequency converter while the stator 16 acts as the primary winding thereof.

With the advent of silicon diodes which are capable of carrying relatively heavy current, it becomes possible to rectify the output of the current transformer exciter and to supply the rectified A.C. to the field coils of the alternator. The silicon diodes, or similar rectifiers, are indicated at 30 in FIG. 1 and are connected, as shown, by leads 32 to the exciter rotor windings 17 and by leads 33 to the field windings 12. The opposite ends of the windings 12 and 17 are connected together as at 34. While a single rectifier is shown in the drawings it will be appreciated that these devices may be paralleled to whatever extent is desired, depending on the magnitude of the current involved, and can be connected as full wave rectifiers instead of the half-wave rectifier connections shown in the drawings, or connected as multi-phase rectifiers corresponding to the exciter rotor winding.

Turning now to the circuit diagrams shown in FIGS. 5 to 11 inclusive, the excitation system of the present invention is shown basically in FIGURE 5 with the stator of the main generator represented as a three-phase, star connected unit 10. The field of the main generator is shown at 12 and is connected through rectifier 30 to the secondary windings of the exciter which is here represented as a transformer, the primary comprising the exciter stator windings 16 and the secondary comprises the exciter rotor windings 17. The exciter stator windings 16 are connected to a relatively small portion of the main generator power winding 10. A brushless unit may be made by placing the rotating transformer secondary in the form of the wound rotor previously described, on a common shaft with the main generator rotor and using a rotating rectifier system.

In the event that the rotating transformer exciter is separately driven or if a stationary transformer exciter is used, slip rings will be necessary to connect the output of the transformer exciter secondary through suitable rectifiers to the rotating field coil 12 of the generator.

The main generator is provided with a tapped winding in its stator, and leads 50 and 51 connect therefrom to the primary 16 of the exciter unit which would be the stator of a rotating transformer exciter, or the primary of a stationary transformer exciter. The voltage of the tapped portion of the generator winding represents only a small portion (for example approximately 4% on a 10 kw. machine) of the voltage of the entire winding. Thus a small voltage is available to cause current flow through the transformer exciter primary 16 and an A.C. voltage is induced in the exciter secondary 17. The exciter primary voltage would have in the exciter stator 16, the same frequency as the frequency of the main generator. In the case of a rotating transformer induction frequency converter exciter, the exciter rotor 17 delivers its power at a frequency proportional to the relative speeds of the exciter primary field and the exciter rotating member. For example, if the exciter is wound with the same number of poles as the main generator, and is driven at the same speed as the speed of the main generator rotor, the frequency of the voltage appearing at the output of the exciter rotor would be either zero frequency or twice the main generator frequency depending on the connections. The double frequency connection is preferred. Of course, a variation in rotational speed of exciter rotor and main generator rotor will give other frequencies, as is known in the art. The output voltage of the exciter is rectified by rectifier 30 and applied to the main generator field windings 12.

Figure 7:
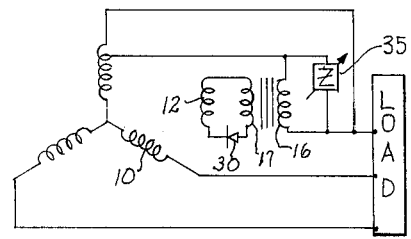
Figure 8:
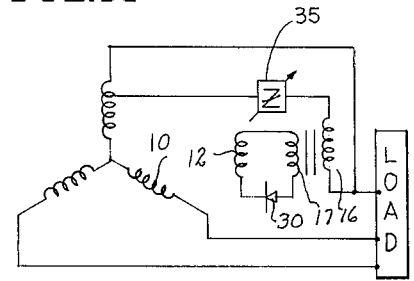
Figure 9:
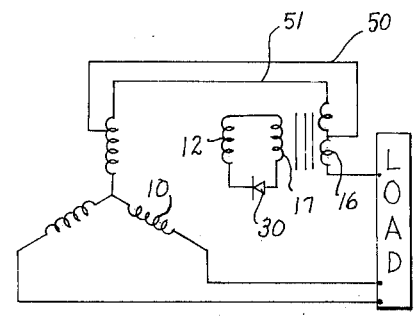

Voltage regulation of the main generator can be readily obtained by placing a variable impedance 35 in parallel with the primary of the exciter as in FIG. 7, or in series therewith, as in FIG. 8.

To obtain compounding characteristics the exciter primary winding 16 may be connected in series with the power winding circuit of the main generator whereby the secondary output voltage of the exciter is influenced by the load current of the main generator. It will be seen from FIGS. 9, 10, 11 and 13 that it is possible to obtain both fixed and compounding characteristics in the transformer exciter by connecting a portion of the exciter primary windings across a small portion of the A.C. voltage derived from the main generator winding. Another portion of the exciter primary winding is connected in series with the power windings of the main generator. In the case of a rotating transformer exciter it is preferable that a balanced consequent pole connection be used in the exciter stator winding whereby in each phase all poles of a given polarity are used in the shunt portion of the stator winding and in each phase all poles of the opposite polarity are used in the series or compounding portion of the stator winding.

Figure 10:
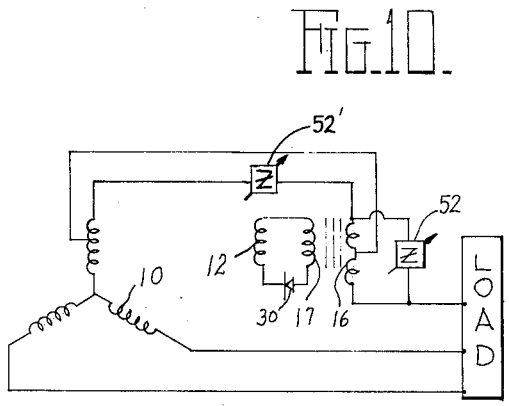

As indicated in FIG. 10 regulation of this system, while inherently sensitive to load current, may be enhanced by the insertion of a variable impedance 52 in parallel with the primary of the transformer exciter. A variable impedance may also be connected in series with the shunt portion of the primary of the transformer exciter as indicated at 52′ in FIG. 10, if desired.

It will be seen that the response time of the exciter 18 with a change in load of the systems described above is very fast since the exciter carries an A.C. voltage corresponding to the load current which appears immediately in the transformer exciter primary, and an increase in load current will cause an immediate increase in the flux linking the exciter secondary and thus an increase in the exciter voltage output which is rectified and applied to the generator field.

Figure 11:
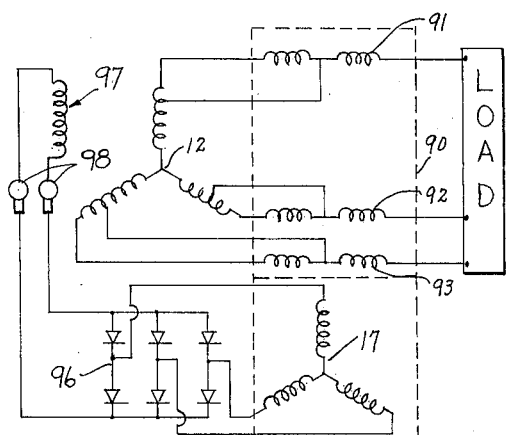

In the circuit diagrams shown in FIGS. 5 to 10, inclusive, the transformer exciter is represented as being a single-phase unit. It will be appreciated, of course, that the transformer exciter may be made multiple-phase as indicated in FIG. 11. In this instance each of the phase windings of the main generator is provided with a tap which is connected to the tap of a respective primary winding 91, 92, 93 of the primary of the transformer exciter which is designated generally 90. The secondary of the transformer exciter is shown as a three-phase, star connected unit, and is magnetically coupled to the respective primary windings above-mentioned. The output of the secondary is taken to a rectifier system which may be a full wave rectifier 96 and the rectified voltage is taken to slip rings 97 and thence to the main generator field winding, here designated 98. If the rotating transformer exciter is separately driven, or is used in a brushless unit as above-described, its connections can be made as a rotating frequency converter so that the frequency of its output to the rectifier system differs from the frequency of the main generator by an amount determined by the relative speed of rotation and number of poles of the main generator and of the windings of the transformer exciter.

FIG. 12 shows the basic system applied to an independently driven exciter 100. In this unit, the exciter has its own prime mover 101, and the main generator 102 is coupled to a prime mover 104. As in the previously described forms the exciter primary takes current from the main generator power windings at the frequency of the output thereof. The exciter 100 is operated as a rotating transformer induction frequency converter, being driven at the same speed or faster or slower than the main generator, and the delivered voltage of the exciter is at a frequency proportional to the relative speeds of the exciter primary magnetic field and the exciter secondary rotating member and to the relative number of poles in the exciter and main generator power windings. As above noted, the primary field 16 carries its voltage at the frequency of the main generator, but the output frequency of the rotating member 17 can be changed as desired by changing the speed, or direction of rotation, of the prime mover 101. The output voltage of the exciter winding 17 is rectified by a rectifier 30 and applied to the field winding 12 of the main generator. If the rectifier 30 is a stationary unit, slip rings must, of course, be used to lead the exciter voltage to the generator field.

In place of the tapped power winding of the main generator, the present invention comprehends the use of a separate auto-transformer connected across one or each of the phases of the main generator power winding 10. Further, the present invention also includes the use of a conventional transformer exciter as a stationary element rather than the rotating transformer exciter element described in the previous forms. Such modification of the invention is shown in FIG. 13. In this case the autotransformer 111 having a tap 112 is connected to the tap of a divided primary winding 113 of the transformer exciter which is here designated 114. The secondary of the transformer exciter is shown at 115, and the rectifier associated therewith is indicated at 116. The rectified output of the transformer exciter is applied to the field winding 117 of the main generator through slip rings 118. In this instance both the autotransformer and the transformer exciter may be made stationary elements. It will be appreciated, however, that the stationary transformer exciter can be supplied with voltage from the tap of the main generator power winding as in the forms previously described. In either event, the voltage to the transformer exciter represents only a small fraction of the voltage of the main generator power winding.

The variable impedance controls diagrammatically indicated in FIGS. 7, 8 and 10 can, of course, be used equally well with the system shown in FIG. 13.

It will be seen that the present invention provides a simple and effective means, involving primarily a transformer exciter connected to receive in its primary winding a small voltage from the main generator power winding serving as a means to regulate and establish the no-load voltage of the main generator. Further, the invention, by the use of a series winding on the exciter transformer primary, provides a simple and efficient means that is inherently sensitive to load current, to assure a very fast response of the exciter output upon a change in load. It has been found that a generator constructed in accordance with the present invention is capable of supplying high pulse or high transient low power factor loads with a minimum of voltage dip. The machine, therefore, is admirably suited for use in supplying loads such as induction motors which are in turn connected to varying mechanical loads, or which must be started and stopped at frequent intervals. The machine has been found to operate satisfactorily under extremes of environmental conditions with minimum maintenance.

What I claim is:

In an alternating current generator having relatively rotating D.C. field and A.C. power windings, means to supply voltage to said D.C. field winding comprising a transformer exciter having a first primary winding connected in shunt across an A.C. voltage derived from said power winding and representing only a small portion of the voltage of said power winding, a second primary winding connected in series with the load on said A.C. power windings, said first and second exciter primary windings being connected as consequent pole windings on said exciter stator, means to connect all windings of a given polarity as said first shunt primary windings, means to connect all windings of the opposite polarity as said second series primary winding, means to rectify the secondary output voltage of said transformer exciter, and means to apply said rectified voltage to the D.C. field winding of said generator.

References Cited by the Examiner

UNITED STATES PATENTS

| | | | |
|---|---|---|---|
| 2,377,930 | 6/45 | Fuller. | |
| 2,414,287 | 1/47 | Crever | 310—68.4 |
| 2,497,141 | 2/50 | Schultz | 310—68.4 |
| 2,722,652 | 11/55 | Brainard | 310—68.4 |
| 2,992,380 | 7/61 | Potter | 322—25 |
| 3,035,222 | 5/62 | Stone | 318—225 X |

JOHN F. COUCH, *Primary Examiner.*

MILTON O. HIRSHFIELD, ORIS L. RADER,
*Examiners.*